United States Patent
Sweet et al.

Patent Number: 5,271,334
Date of Patent: Dec. 21, 1993

[54] CART LOADING EQUIPMENT HAVING RECIPROCATING PUSHER AND CHAIN CONVEYORS WITH SENSOR OPERATED CENTRAL CONTROL

[75] Inventors: Robert P. Sweet, Red Wing; Mark R. Rosa, Inver Grove Heights; Alexander Vigdorovich, St. Paul; James E. Kovacs; Patrick J. Geraghty, both of Minneapolis; Steven A. Rahman, Oronoco, all of Minn.

[73] Assignee: IMI Cornelius Inc., Anoka, Minn.

[21] Appl. No.: 771,691

[22] Filed: Oct. 4, 1991

Related U.S. Application Data

[63] Continuation-in-part of Ser. No. 711,675, Jun. 6, 1991.

[51] Int. Cl.⁵ .............................. B61J 3/04; B61J 3/08
[52] U.S. Cl. .................................. 104/102; 104/162; 104/171
[58] Field of Search .............. 104/96, 102, 130, 162, 104/170, 171, 172.3; 198/465.1, 465.2

[56] References Cited

U.S. PATENT DOCUMENTS

| | | | |
|---|---|---|---|
| 1,522,116 | 1/1925 | Gray et al. | 104/162 X |
| 3,048,126 | 8/1962 | Salapatas | 104/96 X |
| 3,518,946 | 7/1970 | Kavieff | 104/172.3 |
| 3,696,754 | 10/1972 | Anderson et al. | 104/162 |
| 4,462,735 | 7/1984 | Bain et al. | 198/465.1 X |
| 5,001,987 | 3/1991 | Ziegenfus et al. | 104/130 X |

FOREIGN PATENT DOCUMENTS

287912  3/1991  German Democratic Rep. .................. 104/102

*Primary Examiner*—Robert J. Oberleitner
*Assistant Examiner*—S. Joseph Morano
*Attorney, Agent, or Firm*—Sten Erik Hakanson

[57] ABSTRACT

A newspaper bundle handling system is shown and includes a bundle arranging and loading apparatus for arranging and loading successive layers of newspaper bundles on a wheeled cart. The present invention also includes a conveying mechanism for conveying empty carts to the loading apparatus and for subsequently conveying loaded carts away from the loading apparatus.

23 Claims, 9 Drawing Sheets

CART LOADING EQUIPMENT HAVING RECIPROCATING PUSHER AND CHAIN CONVEYORS WITH SENSOR OPERATED CENTRAL CONTROL

The present application is a co-pending continuation-in-part of U.S. Ser. No. 711,675, filed Jun. 6, 1991.

FIELD OF THE INVENTION

The present invention relates generally to cart loading equipment and specifically to equipment for loading multiple bundles of newspapers, and the like, onto moveable carts.

BACKGROUND OF THE INVENTION

Currently, after printing, newspapers are arranged in bundles for distribution to various locations. This distribution is generally achieved through the use of trucks for the delivery of the bundles to the particular locations. In addition, there is now a trend among newspapers of large circulation in major metropolitan areas to first deliver the bundles to one of several distribution centers, from which centers the bundles are dispersed to the parties responsible for the delivery of the papers to the ultimate sales location, office or residence.

A major problem concerns the loading of the delivery trucks which loading continues to require the manual handling of each bundle. Such a process is, of necessity, labor intensive and time consuming, and therefore inefficient and costly.

Accordingly, it would be highly desirable to have an apparatus and method for automating the process of handling and loading bundled newspapers, and the like, onto trucks.

SUMMARY OF THE INVENTION

The present invention discloses a method and apparatus for loading bundles of newspapers, and the like, onto moveable carts. The invention herein includes an arranging conveyor, a loading apparatus and a lift station. The arranging conveyor delivers and assembles groupings of newspaper bundles to a first loading position within the loading apparatus. A first pneumatic cylinder is secured to the frame of the loading means and extends substantially perpendicular to the travel of the conveyor means. A plate secured to the first cylinder provides for the pushing of the bundle grouping into a transfer station. The transfer station is slideably suspended from the loading apparatus frame. A second pneumatic cylinder is secured to the frame and provides for moving the transfer station in a direction substantially parallel with the direction of movement of the first cylinder for moving the carrier into a wheeled cart. A third cylinder is secured to the frame and extends substantially vertically with respect to the horizontal orientation of the first two cylinders. The third cylinder is secured to a bundle stop plate and provides for moving the plate up and down in a vertical direction. The lift means is positioned adjacent the loading machine and provides for receiving of a wheeled cart thereon, and provides for controllable raising and lowering of the cart.

The present invention also includes cart conveying means for automatically conveying empty carts to the lift station and loading them thereon. The cart conveying means also provides for removing the carts from the lift after they are filled, and transporting the loaded carts to an outlet area for ultimate distribution.

The cart conveying means basically includes an intake shuttle conveyor, a transfer conveyor and an outlet shuttle conveyor. The intake conveyor includes a pneumatically operated arm having pivotally mounted dogs thereon for moving the carts in a shuttle or ratcheting motion to the opposite end thereof. The first shuttle conveyor includes a further pneumatic cylinder for loading the cart from the shuttle conveyor to the transfer conveyor. The transfer conveyor is mounted substantially at right angles to the first shuttle conveyor and includes a plurality of paired cart wheel tracks connected to a continuous chain drive for transferring the carts laterally to a position adjacent the lift station. A lift loading pneumatic cylinder provides for moving the cart from the transfer conveyor to the lift station.

After a cart is loaded onto the lift, the lift is operated to move the cart to a full up or top position. The arranging conveyor and the loading apparatus are then operated as above described to deliver the grouping of the bundles to the first position adjacent the pushing plate of the first cylinder. The first cylinder is then extended to load the grouping of bundles into the transfer station, after which it is retracted. The second cylinder then extends to move the transfer station into the cart, after which the third cylinder is operated to lower the bundle stop plate behind the grouping of bundles held in the transfer cart. The second cylinder then retracts the transfer station, where upon the bundle stop plate blocks the movement of the bundles which are then deposited in the cart as the transfer cart slides from beneath the bundles. The third cylinder is then retracted to lift the bundle stop plate and the cart lift is operated to lower the cart in an amount approximately equal to the height of the bundles for permitting subsequent repeat of the above described sequence wherein another layer of bundles is added to the cart. This procedure continues until the cart is fully loaded.

When the cart is fully loaded, it can be removed from the cart lift station to the second or out-take shuttle conveyor. The cart lift platform includes a pneumatic cylinder attached to a pivotally mounted dog for moving the cart off the platform. The second shuttle conveyor includes a pneumatic cart pulling mechanism for first pulling the cart to a banding station for banding of the bundles to the cart, and then from the banding station to a first end of the second shuttle conveyor so the cart can be engaged with a shuttle conveyor mechanism of the out-take conveyor. The plurality of loaded carts are then moved in a ratcheting motion by the shuttle conveyor mechanism to the end of the out-take conveyor for ultimate distribution.

It can be appreciated by those of skill that the present invention provides an apparatus and method for eliminating the manual handling of individual bundles of newspapers, and the like, presently required in the loading such articles for ultimate distribution.

DESCRIPTION OF THE DRAWINGS

A further understanding of the structure and advantages of the present invention can be had by reading the following detailed description which refers to the following figures, wherein.

DETAILED DESCRIPTION

Figure 1:
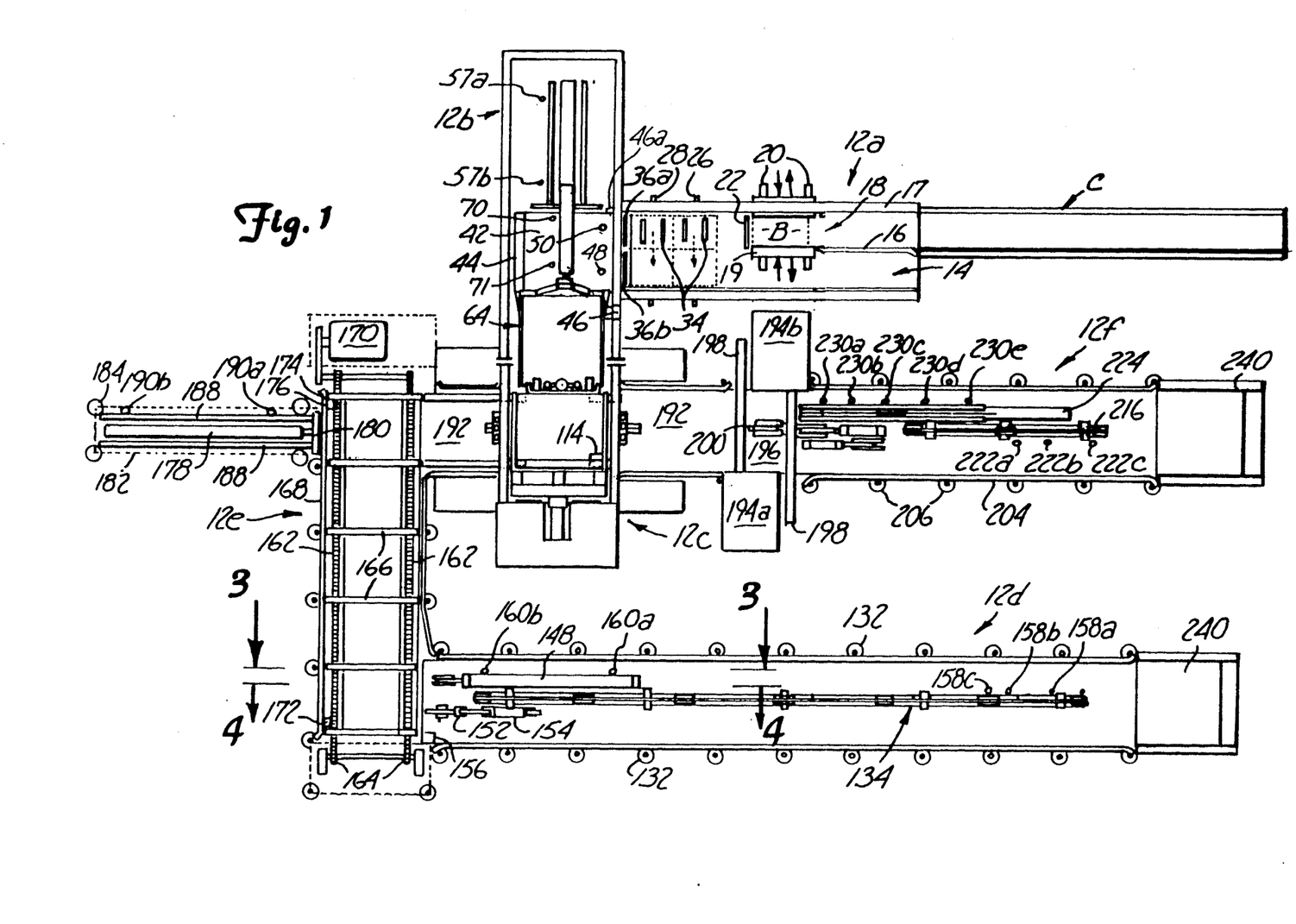
FIG. 1 shows a top plan view of the present invention.

Referring to FIG. 1, machine 10 includes an arranging conveyor 12a, a loading apparatus 12b and a lift station 12c. Arranging means 12a includes a rigid frame 13 having a conveyor 14. Conveyor 14 consists primarily of a plurality of driven rollers 15. Conveyor 14 has a central divider wall 16, and end walls 17 extending along the length thereof defining conveyor lanes L1 and L2. A bundle clamping mechanism 18 is secured to conveyor frame 12 and includes two clamping plates 19. Each plate 19 is operated by pneumatic cylinders 20. A movable stop plate 22 is operated by a pneumatic cylinder 24, and both plate 22 and cylinder 24 are secured below conveyor 14. In particular, plate 22 is positioned to extend upwardly between rollers 15 of conveyor 14. A pair of emitting/receiving photo-eye's "ERPE's" 26 and 28 are secured to wall 17 and positioned to permit transmission of light in a direction across conveyor 14.

A pair of lifting and lane changing means 30 are secured below conveyor 14 and include lift portions 32 having a pair of bars 34 that are operable by pneumatic cylinders, not shown, to extend upwardly between rollers 15 and above the top surface of conveyor 14. Changing means 30 also each include further pneumatic cylinders, not shown, for moving their respective lift portions 32 back and forth from one side of conveyor 14 between lanes L1 and L2. These further transfer movement cylinders each include full extension and full retraction sensing proximity switches. A pair of stop plates 36a and 36b operated by cylinders 38a and 38b are secured below conveyor 14 at an end thereof adjacent loading area 42. As with plate 22, plates 36a and 36b are positioned normally-up and are moveable up and down between rollers 15.

Figure 2:
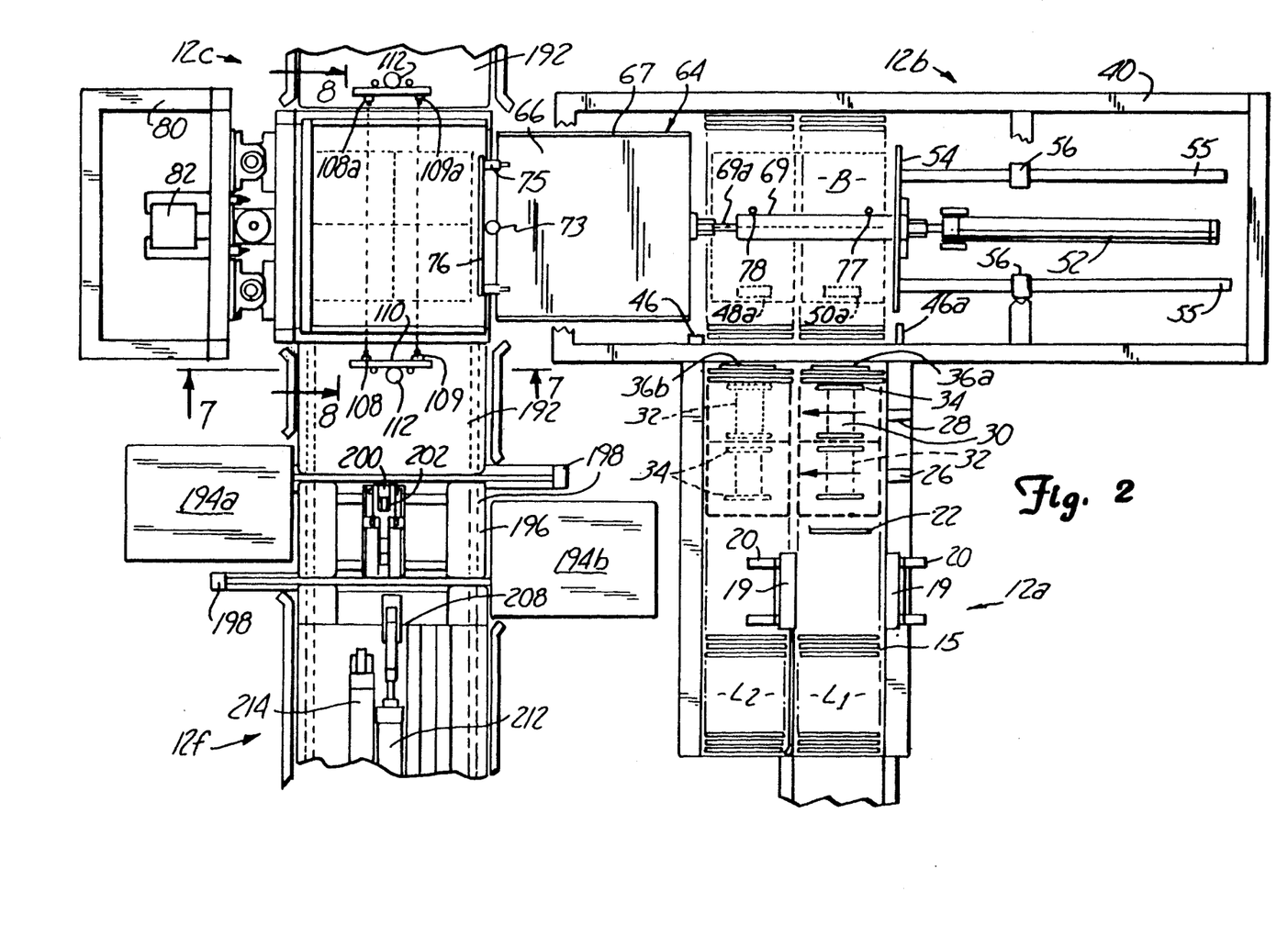
FIG. 2 shows an enlarged top plan view of the present invention.
Figure 10:
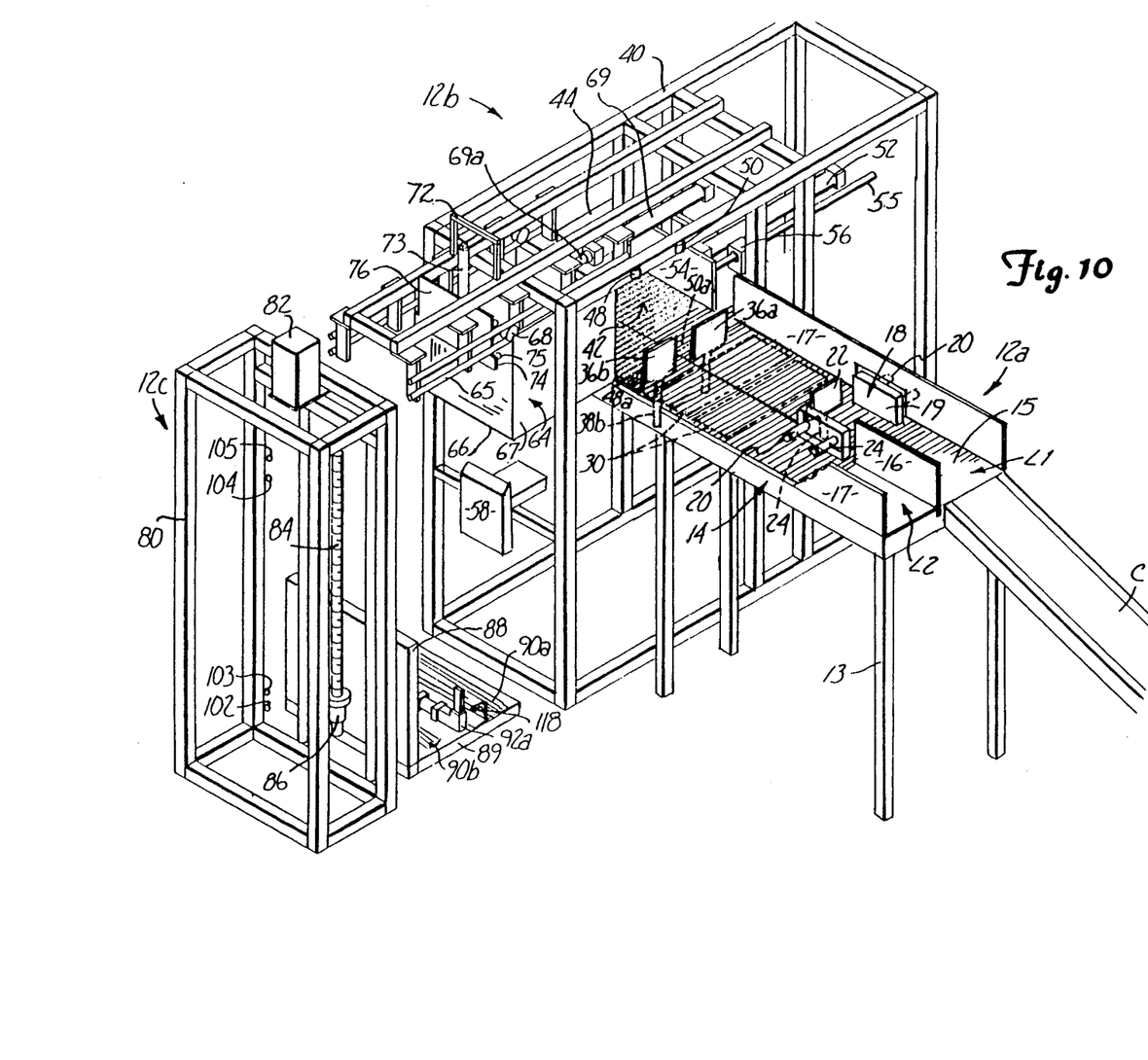
FIG. 10 shows a perspective view of the arranging conveyor, loading apparatus and the cart lift station.

As seen specifically in FIG.'S 1, 2 and 10, loading apparatus 12b includes a frame 40 into which conveyor 14 extends and terminates, and defines a first bundle loading position or area 42 blocked on one end by a bundle stop wall 44. ERPE's 46, 48 and 50 are secured to frame 40 and directed towards reflectors 46a, 48a and 50a respectively wherein ERPE 46 is pointed horizontally across conveyor 14, and ERPE's 48 and 56 are pointed downwardly at conveyor 14. A cylinder 52 is secured to frame 40 and provides for operating a flat pushing plate 54. Plate 54 includes a pair of guide rods 55 secured thereto. Guide rods 55 extend through guides 56 for maintaining plate 54 in a plane substantially perpendicular to the extension of cylinder 52. Guide rod proximity switches 57a, and 57b are mounted to frame 40 adjacent the extension of one of the guide rods 55 for sensing the full extension and full retraction of cylinder 52. A bundle retaining shoe 58 is operated by a cylinder 59 and both are mounted to frame 40 at an end thereof adjacent lift station 12c.

Figure 11:
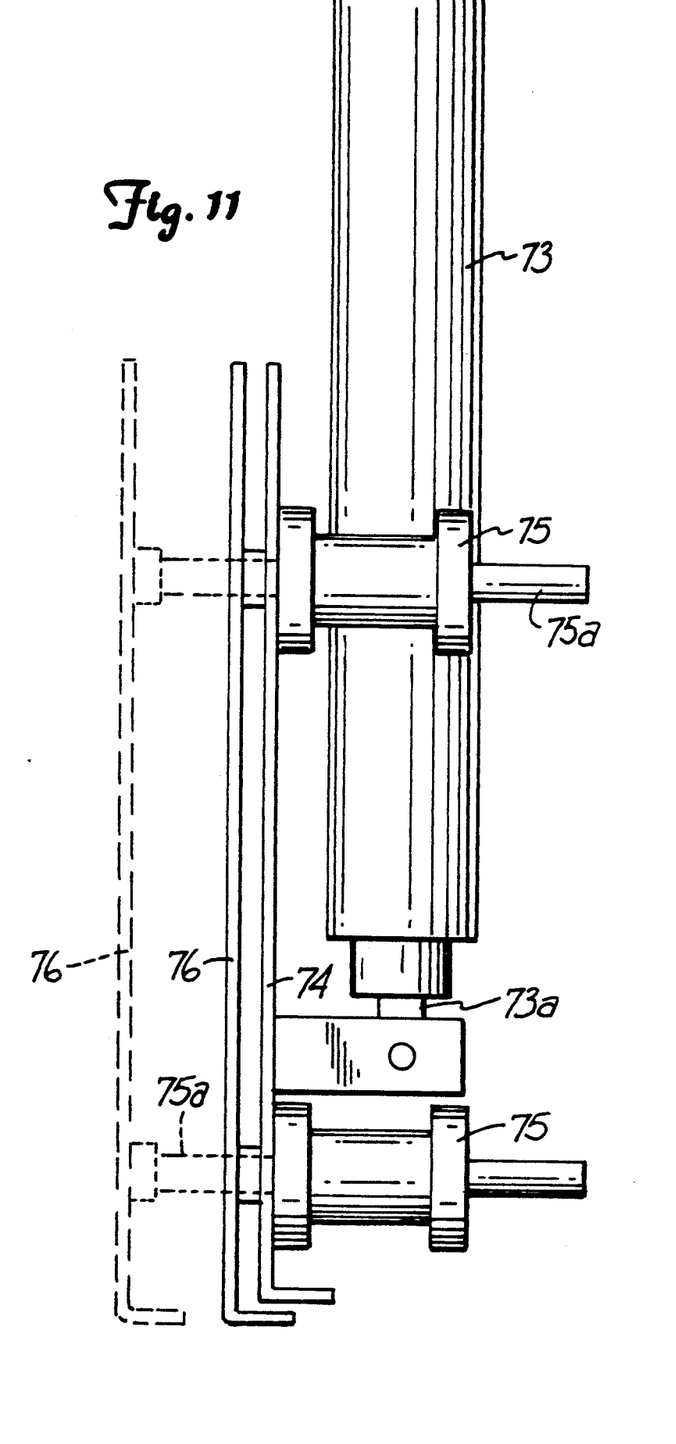
FIG. 11 shows an enlarged side plan view of the bundle stop plate.

A U-shaped transfer station 64 or carrier is slideably suspended from a pair of tracks 65 of frame 40. In particular, transfer station 64 includes a carrier bottom surface 66 having walls 67 integral therewith and extending upwardly therefrom. A plurality of wheels 68 cooperate with and run on tracks 65 and are rotatively secured to walls 67 for providing the slideable suspending therefrom of carrier 64. A cylinder 69 having a piston arm 69a is connected to frame 40 and to carrier 64 for providing motion thereof in a direction substantially parallel with the extension of pushing plate cylinder 52. Proximity switches 70 and 71 are secured to frame 40 adjacent cylinder 69 for sensing the position of carrier 74 by the full extension or full retraction of cylinder 69. Frame 40 includes a support portion 72 to which is secured a cylinder 73. Cylinder 73 has a piston arm 73a connected to a rigid plate 74, and plate 74 has four cylinders 75 secured thereto. Cylinders 75 have piston arms 75a extending through plate 74 and secured to movable plate 76. Cylinder 73 serves to operate plate 74, and with it, cylinders 75 and plate 76 through a vertical orientation substantially perpendicular to the extension and travel of transfer station 64 and pushing plate 54. Cylinders 75 provide for moving plate 76 horizontally as indicated in FIG. 11. A pair of proximity switches, (not shown), are secured adjacent cylinder 73 for sensing the full retraction or extension respectively of cylinder 73.

Figure 5:
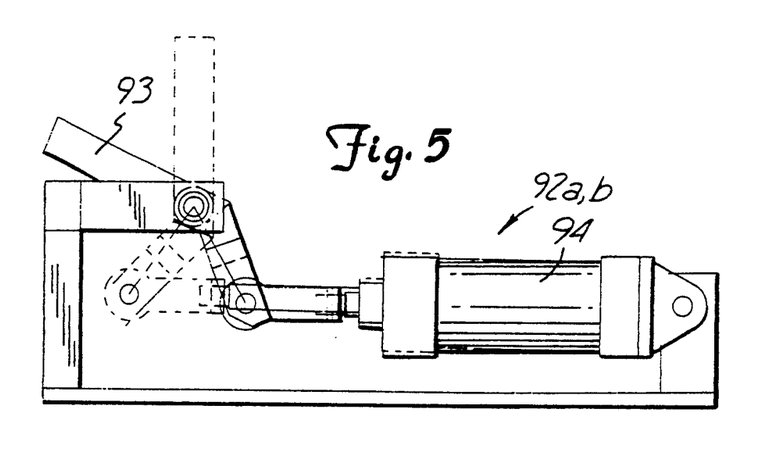
FIG. 5 shows a stop mechanism and operating piston.
Figure 7:
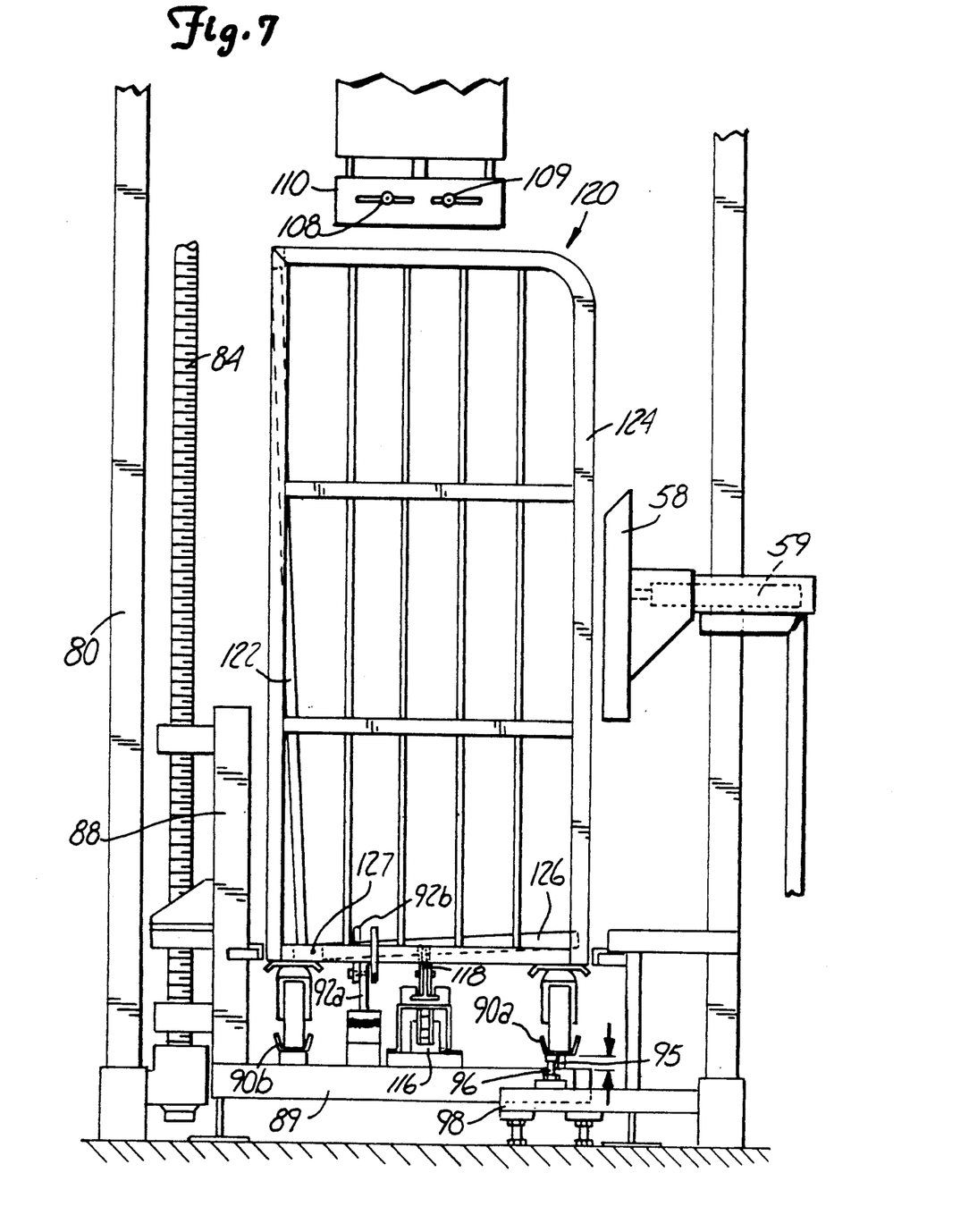
FIG. 7 shows a side plan view of the lift station along lines 7—7 of FIG. 2.

Referring to FIG.'S 1, 2, 7, 8 and 10, lift station 12c includes a rigid frame structure 80 to which is secured a step motor 82. Station 12c also includes a screw shaft drive mechanism having a screw shaft 84 and nut 86. A cart support 88 is secured to nut 86 and includes cart support base platform 89 having a pair of cart wheel guiding tracks 90a and 90b thereon. Platform 89 also includes a pair of pneumatically operated stop mechanisms 92a and 92b. Stops 92a and 92b are represented in more detail in FIG. 5, and include pivotally mounted stop arms 93 operated by pneumatic cylinders 94. Arms 93 are independently operable between down positions and up positions. Track 90a is secured to a pair of pins 95 that slideably extend into platform 89. A pair of bolts 96 are rigidly secured to a frame piece 98 and are positioned thereon at both ends of track 90a so that track 90a rests thereon when platform 89 is in the full down position, as seen in FIG. 7. Lift station 12c has four platform position limit switches 102, 103, 104 and 105. Frame 80 also includes a pair of ERPE's 108 and 109 having respective reflectors 108a and 109b. ERPEs 108 and 109 and reflectors 108a and 109b, are secured respectively to supports 110. Each support is operable between a full up and full down position by pneumatic cylinders 112, which cylinders 112 work coordinately. At the full down position ERPE's 108 and 109 and their respective reflectors are at a level substantially equivalent with the level of base 66 of carrier 64. A cart sensing limit switch 114 is secured to lift base 89 for indicating when a cart is loaded thereon. Base 89 also includes a cart unloading mechanism secured thereto consisting of a pneumatic cylinder 116 having a pivotally mounted pushing dog 118 secured to the piston rod thereof.

Figure 8:
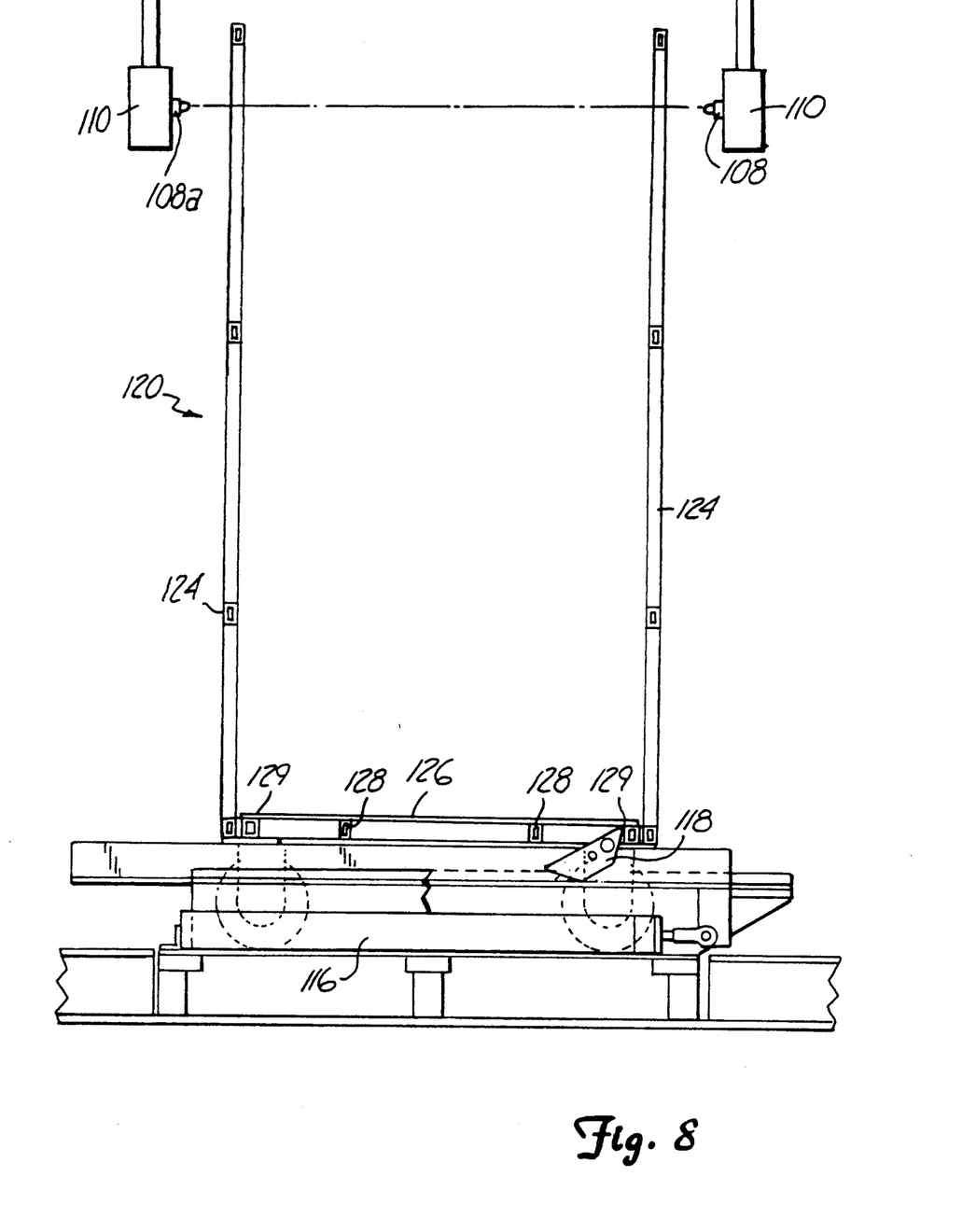
FIG. 8 shows a cross-sectional view along lines 8—8 of FIG. 2.

Lift station 12c provides for the lifting of a cart 120. As more particularly seen in FIG.'S 7 and 8, cart 120 includes a back wall 122 and two sidewalls 124. One of the sidewalls 124 is preferably hingedly secured to back wall 122 as, for example, is seen in Applicant's copending application Ser. No. 07/711,675, which application is incorporated herein by reference thereto. Caster wheels 125 are secured to walls 122 and 124 to provide for easy mobility thereof. A base plate 126 is hingedly secured to the bottom of back wall 122 by hinges 127. As seen in FIG. 7, back wall 122 and base 126 are oriented at an angle with respect to sidewalls 124. Thus, when cart 120 is sitting on level ground, the angular orientation of back wall 122 and base 126 will cause bundles or other articles loaded therein to lean towards back wall 122, thereby diminishing the tendency of articles stacked therein to fall in the opposite direction out of the cart. Also, base 126 includes a central frame structure members 128 and end members 129. Frame sides 122 and 124, along with base plate 126, define an interior cart loading volume.

Referring again to FIG. 1, it can be seen that the present invention also includes a conveying apparatus for delivering carts to lift station 12c and subsequently removing them therefrom after they have become loaded with bundles. In particular, this conveying apparatus includes an intake shuttle conveyor 12d, a lateral conveyor 12e, and an out-take shuttle conveyor 12f.

Figure 6:
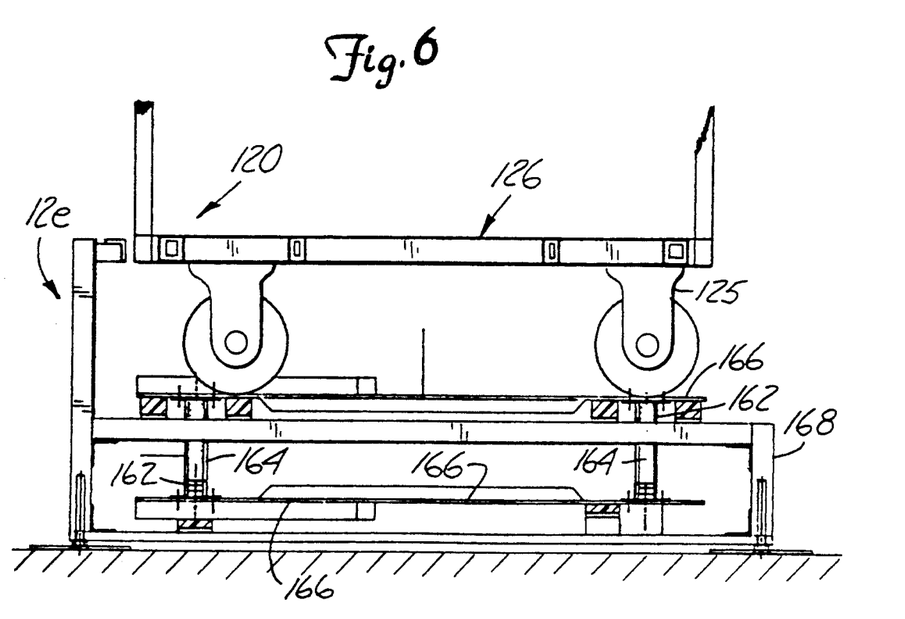
FIG. 6 shows a side plan view along lines 6—6 of FIG. 1.

Also referring to FIG.'S 3 and 4, shuttle conveyor 12d is shown to include a frame 130 having a plurality of feet 132. A shuttle conveying bar 134 is slideably mounted to upright supports 136 and includes a plurality of dogs 138 pivotally mounted thereto on pins 140. Shuttle bar 134 is operated in a back and forth or ratcheting manner by pistons 142 and 144. Piston 142 is of a four inch (4") stroke and piston 144 is of a twelve inch (12") stroke, and both pistons are secured end to end. Piston arm 142a of piston 142 is secured to a stop 146 and piston arm 144a of piston 144 is secured to bar 134. Shuttle conveyor 12d also includes a cart loading piston 148 having a pivotally mounted dog 150 thereon and includes a stop mechanism consisting of a stop arm 152 and a operating cylinder 154. This stop mechanism is similar in construction to the previously described stop mechanism seen in FIG. 5. A cart sensing limit switch 156 is secured to conveyor 12d on the end thereof adjacent lateral conveyor 12e. In addition, three (3) proximity switches 158 a, b, and c, are secured adjacent bar 134 to provide for sensing the full extension and retraction of cylinders 142 and 144. Likewise, a pair of proximity switches 160 a and b sense the full extension and retraction of loading cylinder 148. Referring also to FIG. 6, it can be seen that lateral conveyor 12e includes continuous chains 162 driven by sprockets 164 and including secured thereto cart wheel track pairs 166. Conveyor 12e also includes a frame 168 and drive means 170. Limit switch 172 is secured to conveyor 12e and provides for the sensing of a cart positioned thereon in tracks 166. At the opposite end of conveyor 12d from limit switch 172 is a further limit switch 174 and directly below limit switch 174 is a proximity switch 176. A cart loading cylinder 178 is secured adjacent lateral conveyor 12e at the end thereof adjacent loading station 12c. Cylinder 178 includes a pushing plate 180 and is supported on a frame 182 having support feet 184. Cylinder 178 also includes a pair of guide rods 188 for supporting cylinder 178 as it extends. A pair of proximity switches 190 a and b are secured adjacent one of the guide rods 188 for sensing the full extension and retraction of cylinder 178.

As seen by referring to FIG.'S 1, 2 and 8, a pair of cart support platforms 192 extend between lift station 12c and lateral conveyor 12e and between lift station 12c and conveyor 12f. Platforms 192 provide for support of cart 120 when it is loaded from lateral conveyor 12e onto lift station platform 89, and from lift station platform 89 to exit conveyor 12f. In addition, the present invention includes a pair of banding machines 194a and 194b for securely strapping the bundles to the cart after it has been loaded. Various banding means are known in the art, in the present invention the particular machines used are made by Ovalstrapping, Inc. P.O. Box 704, Hoquiam, Wash., 98530, model EX415. The pair of banding machines 194a and 194b are positioned between lift station 12c and out-take conveyor 12f. In addition, a short platform section 196 is positioned between the banding arms 198 of banding machines 194. Platform 196 includes a stop mechanism, as per FIG. 5, having a stop arm 200 operated by a cylinder 202. As will be understood by those of skill in the art, banding arms 198 are large structures having rectangular perimeters through which the carts 120 can pass and around which strapping material is threaded. As is known in the art, the carts must stop momentarily for the banding process, which procedure will be described in greater detail below.

Figure 9:
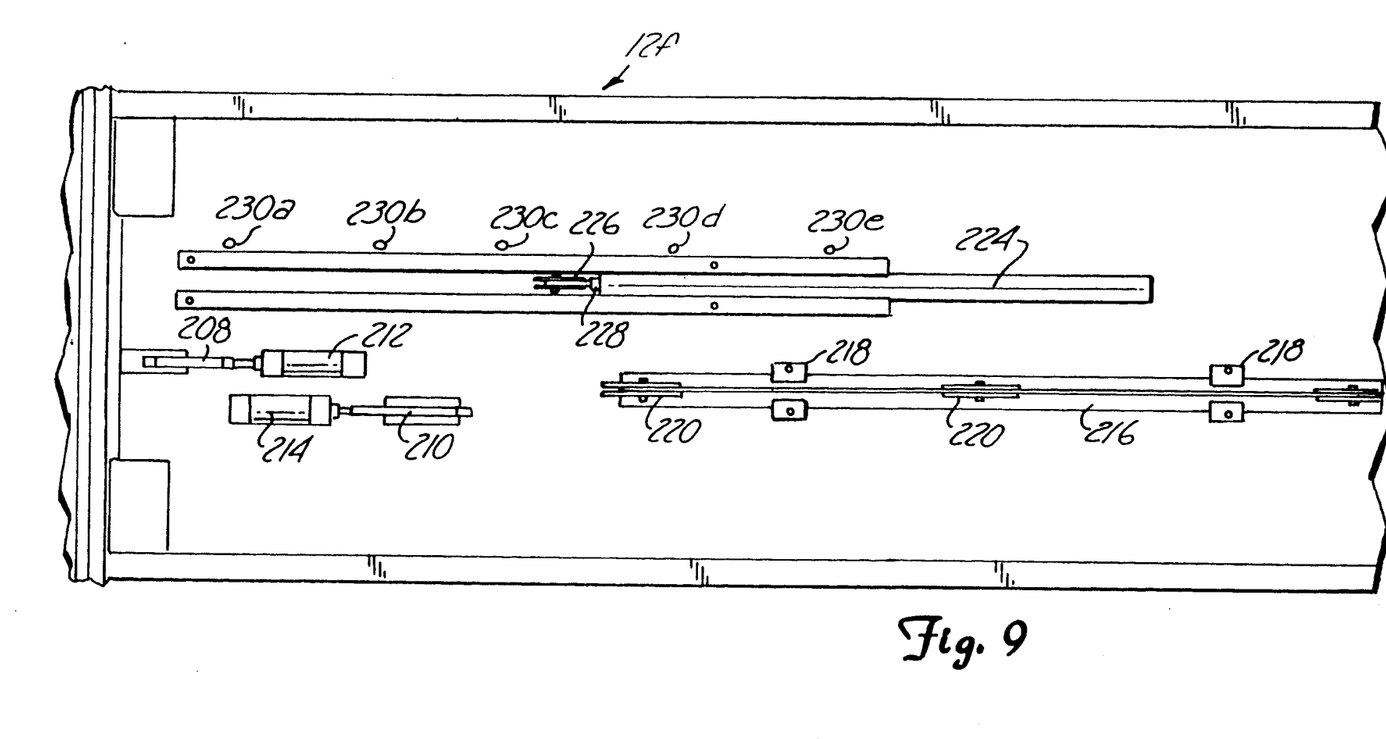
FIG. 9 shows an enlarged top plan view of the outtake conveyor.

As seen by referring to FIG.'S 2 and 9, out-take conveyor 12f includes a frame 204 having a plurality of support feet 206. Conveyor 12f includes two (2) stops, as per FIG. 5, mounted thereon having stop arms 208 and 210 operated by cylinders 212 and 214, respectively. As with intake shuttle conveyor 12d, conveyor 12f includes a shuttle mechanism having a bar 216 slideably mounted on supports 218 and including a plurality of dogs 220. Bar 216 is operated by a pair of cylinders (not shown) as with bar 134 and cylinders 142 and 144, as previously described for shuttle conveyor 12d. Proximity switches 222a, 222b and 222c are secured adjacent bar 216 for sensing the full extension and retraction of the two (2) cylinders (not shown) that provide for the controlled back and forth movement of bar 216. Conveyor 12f also includes a cylinder 224 having a dog 226 pivotally mounted to a piston end 228 thereof. Cylinder 224 includes five (5) proximity switches 230 a, b, c, d, and e adjacent thereto wherein proximity switches 230a and 230e sense the full extension and retraction respectively of cylinder 224 and wherein proximity switches 230b, c, and d determine intermediate positions, as will be described in greater detail below.

It will be understood by those of skill in the art that the present invention uses a programmable logic controller, not shown, for control of the operation of the various pneumatic cylinders based upon the input of the proximity sensors, limit switches and photo-eyes. Various control strategies and equipment can be employed by those of skill. For example, in the present invention separate programmable logic controls provide for operating lift station 12c, arranging conveyor and loading apparatus 12a and 12b, and conveyors 12d, 12e and 12f. Additionally, for purposes of facilitating a clear understanding of the substantive structural elements of the present invention and their operation, the figures do not include representations of various components such as pneumatic cylinder actuating solenoid valves and the associated pneumatic and electrical connections, such structures and their use and operation being well understood by those of skill in the art.

The preferred form of the present invention operates to load a plurality of individual bundles, marked "B", of newspapers and the like onto a wheeled cart. In general this operation first requires delivery of the bundles at a regulated rate to conveyor 14. Such regulated delivery could include a further conveyor, marked "C" in FIG.'S 1 and 2, having an accumulating or diverting system. The present invention is designed to handle a stream of bundles at the rate of approximately 28 to 32 bundles per minute, and cart 120 is designed to hold approximately 28 bundles. This number of bundles would represent a total of 6 to 8 layers depending upon the thickness thereof, 4 bundles per layer.

The control mechanism assumes no bundles of papers are on arranging conveyor, 12a or in the loading apparatus 12b or in a cart 120, and moreover, that no cart is in position on base 89. Thus, at start-up, a conveyor means provides a supply of bundles to arranging conveyor 12a. At start-up, plates 19 of clamp 18 are in the retracted or open position. Stop plates 22 and 36a and 36b are extended upwardly above the level of conveyor 14. Conveyor C delivers bundles to arranging conveyor 14 whereby a plurality of bundles will build up behind stop plate 22. At this point, plate 22 is operated by cylinder 24 to retract below the level of conveyor 14 so that bundles can proceed down conveyor 14 towards stop plate 36a. When ERPE's 26 and 28 are blocked, this indicates that two (2) bundles are in position and, after a short time delay, cylinders 20 cause plates 19 to move towards each other thereby retarding the progress of a further bundle at that position. Shortly thereafter, stop plate 22 is operated by cylinder 24 to extend upwardly above the level of conveyor 14 to provide for stopping the proceeding of any further bundles along conveyor 14. It will be appreciated that the initial operation of clamp 18 prior to the extension of plate 22 insures that a bundle is not positioned partially above plate 22 such that when plate 22 extends above conveyor 14 its movement is not blocked thereby. The raising of plate 22 with a bundle there above can cause the bundle to be rotated in an undesirable orientation which is not suitable for ultimate loading onto a cart 120. Thus, clamp 18 is designed to retard or slow down the movement of a further bundle to insure proper spacing between the bundles for permitting unobstructed operation of plate 22. Lane changing mechanisms 30 are then both actuated to first lift the bundles slightly above conveyor lane L1, then move them transversely across conveyor 14 to the opposite side thereof, and then to be lowered back down onto lane L2 of conveyor 14. It will be appreciated that two (2) bundles are then positioned adjacent stop plate 36b. At this point in time, with the proximity switches (not shown) of lane changing mechanism 30 indicating full extension thereof, lane change mechanisms 30 are retracted and stop plates 22 and 36a and 36b are fully retracted below the level of conveyor 14, and clamp plates 19 are separated. At this point, the two (2) bundles adjacent stop plate 36b can move into loading area 42, and in addition, two (2) bundles can move past plate 22 and straight into loading area 42. When photo-eyes 26 and 28 indicate that two (2) bundles have passed in front thereof, clamping plates 19 are again activated to move together, followed shortly by the extension upward of plate 22. If there is no blockage by the bundles in the line of sight of photo-eye 46, then no improperly positioned bundle is indicated. In addition, photo-eyes 48 and 50, looking downwardly, if blocked by bundles, indicate to the control mechanism that four (4) bundles are in position, as it will be seen that the blockage of photo-eyes 48 and 50 can only occur if two (2) additional bundles are located within the first loading position 42 adjacent wall 44. Stop plates 36a and 36b are then extended upwardly and loading piston 42 is actuated to extend and push the four (4) bundles onto the bottom surface 66 of carrier 64, after which cylinder 52 is retracted.

At start-up of the present invention, a cart 120 must be moved onto lift platform 89 so that bundles can be loaded therein. A more detailed explanation of the conveying of carts 120 to loading station 12c and the loading thereon of carts in sequence will be described below. For purposes of understanding the operation of the loading apparatus 10b, it will be assumed that a cart 120 has been loaded onto platform 89 following operation of lift motor 82 positioning a cart 120 in a top position wherein the base 126 thereof is at a level just below that of carrier base 66. That top platform position being indicated by limit switch 104. Thus, operation of cylinder 69 moves carrier 64 to a position within the interior loading volume of a cart 120. When the full extension of cylinder 69 is sensed, cylinder 73 is operated to move plate 74 and moveable plate 76 into a position behind the arranged group of four (4) bundles with respect to the position of the cart 120. Cylinders 75 are then operated moving plate 76 in the direction towards cart 120. It will be appreciated by those of skill, that this action serves to insure that the bundles are moved closely to back wall 122 of cart 120 so as to take up any spaces there between and insure a fit there against. Cylinders 75 are then operated to retract, followed by the operation of cylinder 69 to the full retracted position moving carrier 64 to its first position. It will be appreciated that the presence of plate 74 serves to block the movement of the four (4) bundles with the carrier 64 as it retracts, thereby depositing the bundles on base 126 of cart 120. The lift motor 82 is then operated to lower platform 89 so that cart 120 is in position to accept a second layer of bundles, after which the above described operation of loading apparatus 12b can be repeated, filling the cart by this sequential operation. The lowering of cart 120 by the lift station 12c to a level just below the top surface of the last added layer of bundles is controlled by photo-eyes 108 and 109. Photo-eyes 108 and 109 are positioned by cylinders 112 along with reflectors 108a and 109a to a level just below that of bottom surface 66 of carrier 64. It can be understood that the light path between photo-eyes 108 and 109 and cooperative reflectors 108a and 109a will be disrupted as long as there are bundles there between. Thus, as cart 120 is lowered sufficiently by lift station 12c, the transmission of light there between will be re-established at the point where the top layer of the last added layer of bundles will be just below the level of carrier base 66. The establishing of transmission to the photo-eyes 108 and 109 thereby signals the controller to stop the lift and add another layer of bundles in the cart. Referring to FIG. 10, bundle retaining shoe 58 is secured to frame 40. Shoe 58 is operated by piston 59 in a direction towards the bundles that are present in a stacked manner in a cart 120. Retaining shoe 58 is operated after the cart has been lowered a sufficient distance so that, when extended, shoe 58 will contact only the bundles within cart 120 and not the cart itself. Shoe 58 thereby provides for added assurance that the bundles remain retained within cart 120 and not fall therefrom. When base 89 reaches the bottom position, as indicated by limit switch 103, retaining shoe 58 is retracted. It will be understood by those of skill that limit switches 102 and 105 provide for top and bottom safety switching so that the lift motor 82 is stopped, should the lift platform exceed limit switches 103 or 104.

Figure 3:
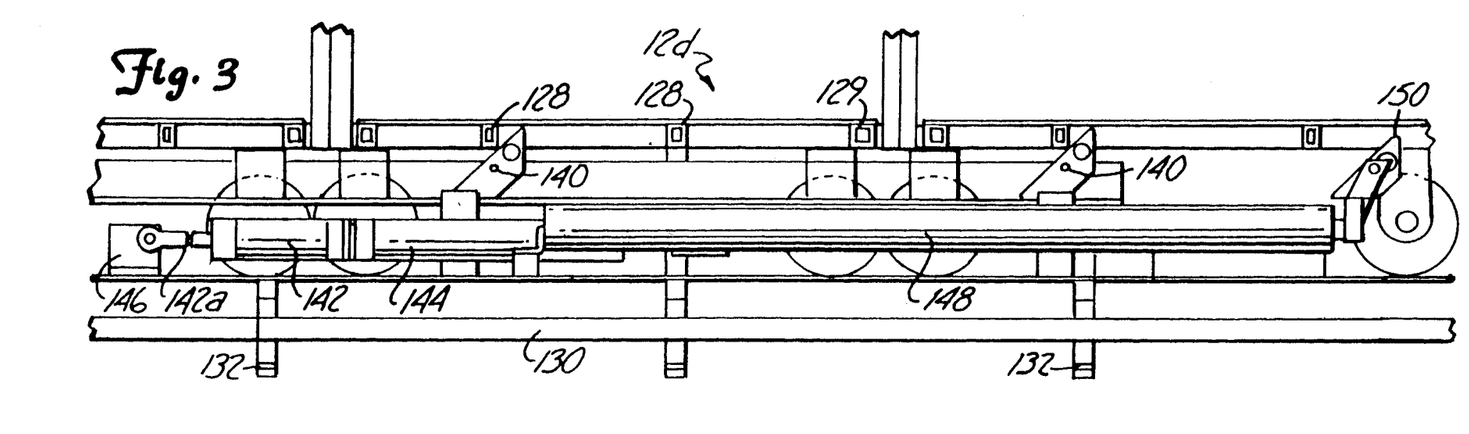
FIG. 3 shows a side plan view along lines 3—3 of FIG. 1.
Figure 4:
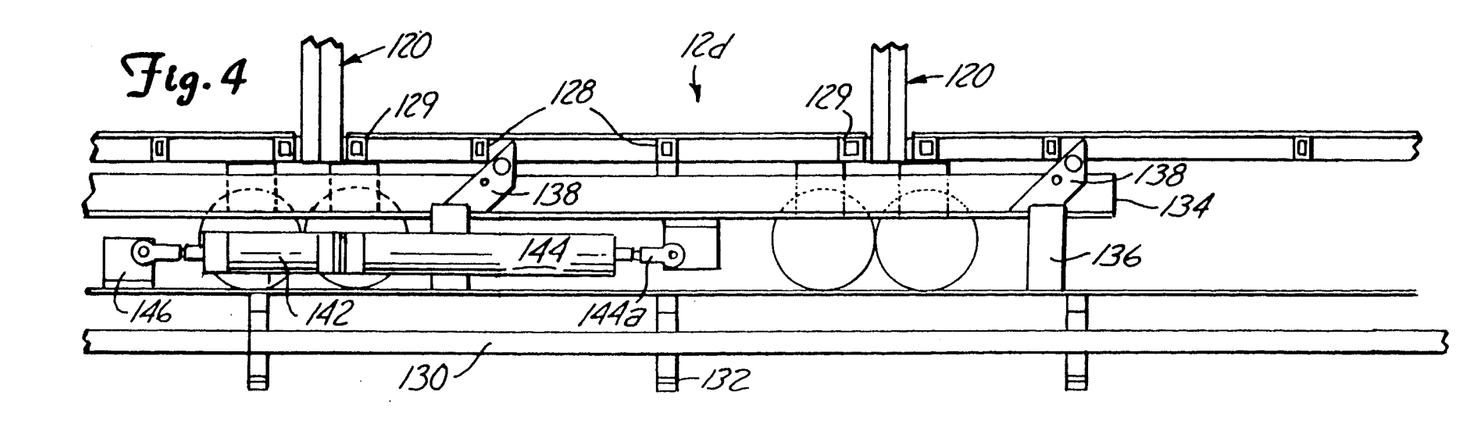
FIG. 4 shows a side plan view along lines 4—4 of FIG. 1 wherein the cart loading piston is removed.

Operation of the cart conveying system can be understood wherein a plurality of carts 120 are initially loaded onto intake shuttle conveyor 12d and manually rolled to a position where dogs 138 can contact the base frame structure thereof. Such contact as seen, for example, in FIG.'s 3 and 4. In the preferred form of the present invention a pair of lifts 240 are secured to the intake and out take ends of conveyors 12d and 12f respectively. Lifts 240 can be hydraulically operated, and in the present invention are manufactured by Globe International, P.O. Box 2274, Tacoma, Wash. 98401. Such lifts provide for lifting and lowering the carts the approximately eight (8) inches that represents the approximate height of conveyors 12d and 12f. In this manner, conveyors 12d, 12e and 12f need not be built below ground surface to eliminate the labor that would otherwise be involved in, for example, rolling the carts up and down ramps. As is understood by those of skill, sequential operation of cylinders 144 and 142 will cause the initial movement of carts 120 first a distance of twelve inches (12"), followed by a distance of four inches (4"), followed by a retraction of sixteen inches (16"). Thus, this ratcheting motion of bar 134 will cause the movement of carts 120 in a direction towards conveyor 12e as the spacing between the bottom frame supports 128 and 129 of carts 120 are less than the sixteen inch (16") total stroke of bar 134. When a cart gets into position at the end of conveyor 12d, such that limit switch 156 is operated, the extension of the shorter cylinder 142 is stopped, leaving only the extending and retracting of the longer cylinder 144. Since the spacing between bottom cart frame portions 129 is in excess of the twelve inch (12") stroke of piston 144, dogs 138 will cycle there between without causing any further movement of carts 120. When limit switch 156 is made and proximity switch 176 of lateral conveyor 12e senses that track pairs 166 are aligned properly and limit switch 174 is not made, that is, indicating no cart is in position on that end of transfer conveyor 12e, loading cylinder 148 can be operated causing the movement of a cart 120 onto lateral conveyor 12e, provided stop arm 152, normally up, is first lowered. Lateral conveyor 12e can then be operated to move carts 120 in direction towards lift station 12c. When limit switch 174 is contacted by a cart 120, the operation of lateral conveyor 12e is stopped. Specifically lateral conveyor 12e is stopped in an accurate manner by proximity switch 176 sensing the precise position of track pairs 166. Providing cart limit switch 114 does not indicate the presence of a cart 120 on cart platform 89, and stop 90b is down and stop 90a is up, cylinder 178 can be operated to load a cart from lateral conveyer 12e onto base 89. Thus, extension of plate 180 causes a cart 120 to roll onto tracks 90a and 90b. Cylinder 178 extends fully, as indicated by proximity switch 190b and the movement of cart 120 is stopped. Such stopping is insured by stop 92a being in the up position. When limit switch 114 indicates a cart is in the correct position on platform 89, stop 92b is operated into the up position whereby cart 120 is retained on, and prevented from rolling off of, base 89. Prior to the loading of a cart 120 onto base 89, photo-eyes 108 and 109 and their respective reflectors 108a and 109a, are moved to a full up position by cylinders 112. The raising and lowering ability of photo-eyes 108 and 109 and their respective reflectors 108a and 109a is necessary to avoid contact with a cart 120 as it is loaded onto base 89. Once a cart is properly positioned on base 89, then cylinders 112 are operated to lower the photo-eyes 108 and 109 and their respective reflectors 108a and 109a to a position just below the level of the base 66 of carrier 64. As previously described, lift motor 82 is operated to bring the cart platform base 89 to the full up position, as indicated by limit switch 104. As base 89 moves upwardly, track 90a lifts above bolts 96 and thereby slides downwardly into base 89 a distance indicated by the arrows marked A, seen in FIG. 7. In this mechanical manner, each cart 120 is tilted from a level position so that the angular position of the back wall 122 and base 126 are compensated for. Thus, with the cart tilted in this way, the interior cart loading volume is made more level to facilitate the loading of bundles therein. Once the cart 120 has been fully loaded, platform 89 is returned to the base, or home, position whereupon track 90a extends upwardly returning the cart 120 to a level orientation with respect to the ground. Stops 92a and b are then lowered and photo-eyes 108 and 109, and their respective reflectors 108a and 109a are raised. Shoe 58 is then retracted so that the cart 120 can be removed from base 89 and replaced with an empty cart.

The removal of a cart 120 from base 89 first involves the operation of cylinder 116 wherein dog 118 contacts the underneath frame bars 128 and 129 of cart base 126. Cylinder 116 fully extends moving cart 120 from platform 89, and then retracts whereby the pivoting action of dog 118 permits such retraction. Cylinder 224 of out-take shuttle conveyor 12f is then operated to fully extend so that dog 226 thereof contacts the frame of base 126 underneath cart 120 so that retraction of cylinder 224 will pull cart 120 further in a direction towards banders 194a and 194b. As seen in FIG. 2, three (3) stops arms 200, 208 and 210, along with proximity switches 230b, 230c and 230d respectively, provide for the pulling of a loaded cart 120 to each of those three (3) positions. If both banders 194a and 194b are operating, arms 200 and 210 are down and not needed, and proximity switch 230c governs the operation of cylinder 224. Thus, the cart is pulled by cylinder 224 to the middle position as represented by stop 208 and switch 230c. In this position, banders 194a and 194b can operate simultaneously to place two (2) bands around each of what will be understood to be two columns of the stacked bundles. The reason for the alternate stops 200 and 210 concerns providing flexibility in the machine should one of the banders 194a or 194b be inoperative. Thus, if 194b is inoperative, stop arm 200 would first be activated to move up and switch 230b would regulate the movement of the cart to this first position, whereupon bander 194a would put on a first band. Stop 200 would then move down, and stop 208 would move up as regulated by switch 230c to stop the progress of the cart at the middle position so that bander 194a could again be operated to place the second band on the cart. Likewise, if bander 194a was inoperative, cart 120 would first be brought to the middle position, represented by stop 208 as regulated by switch 230c, followed by movement to the third position, represented by stop 210 as regulated by switch 230d, whereby bander 194b would be able to sequentially place both bands around the stacks of bundles. When two (2) bands have been placed around the cart 120 securely retaining the bundles thereon, arm 224 is operated to the full retracting position, as indicated by proximity switch 230e. Shuttle conveying arm 216 can then be operated in a manner as analogously described with arm 134 of intake conveyor 12d thereby moving the carts in the direction away from banders 194a and 194b and off of conveyor 12f for removal therefrom and distribution.

It will be appreciated by those of skill in the art that various modifications can be made to the present invention without exceeding the scope thereof. For example, it can be understood that an intake conveyor could be placed in line with an out-take conveyor on opposite sides of the lift station 12c. In this manner, carts would be loaded on one side of the loading station 12c and would be removed on an opposite side therefrom. It will be understood that lateral conveyor 12e provides for loading and unloading of carts from the same side of lift station 12c, whereby the carts move in a U-shaped pattern down conveyor 12d, across conveyor 12e, and then in the opposite direction down conveyor 12f for ultimate unloading.

We claim:

1. A conveying system for conveying wheeled carts from a cart assembly area to a cart loading means, comprising:

a shuttle conveyor having an intake end and an outlet end, and the shuttle conveyor intake end located in the assembly area for receiving a plurality of carts, and the shuttle conveyor having first sensing means connected to a control means for sensing whether or not a cart is present at the shuttle conveyor outlet end, and the shuttle conveyor including a drive bar having a plurality of gravity dogs pivotally secured thereto, the drive bar extended and retracted by a drive cylinder means for moving the carts by intermittent contact with the gravity dogs, and the shuttle conveyor drive cylinder means comprising a first drive cylinder and a second drive cylinder, the control means for operating the first drive cylinder individually or operating both the first and second drive cylinders substantially simultaneously for regulating the amount of extension of the drive bar so that when a cart is sensed at the shuttle conveyor outlet end the first drive cylinder is operated individually so that the distance the drive bar is extended is less than the distance the bar is extended when the first and second drive cylinders are operated substantially simultaneously, wherein this reduced distance prevents driving contact between a gravity dog and the cart at the shuttle conveyor outlet end, and prevents any driving contact between a gravity dog and any further carts accumulated against the cart at the shuttle conveyor outlet end, but where the single operation of the first drive cylinder permits additional movement of any further carts on the shuttle conveyor that are not accumulated against the cart at the shuttle conveyor outlet end, a lateral conveyor having an intake end and an outlet end, and the lateral conveyor extending transversely to the shuttle conveyor wherein the lateral conveyor intake end is positioned adjacent the shuttle conveyor outlet end for receiving carts directly from the shuttle conveyor, and the lateral conveyor for moving the carts there along from the intake end to the outlet end thereof, first transfer means for transferring the carts from the shuttle conveyor outlet end to the lateral conveyor intake end, second transfer means for transferring the carts from the lateral conveyor outlet end to the loading means, and the control means for regulating the operation of the shuttle and lateral conveyors, and the first and second transfer means so that the operation thereof is coordinated for moving the carts individually from the assembly area to the loading means.

2. The system as defined in claim 1, and the lateral conveyor comprising a continuous chain conveyor having a drive motor for operating a pair of continuously driven chains, and the chains having a plurality of cart wheel receiving guide pairs.

3. The system as defined in claim 2, and further including second and third sensing means connected to the control means, the second sensing means for sensing whether or not a cart is present at the lateral conveyor intake end, and the third sensing means for sensing the position of the wheel guide pairs with respect to the shuttle conveyor outlet end for providing alignment of the guide pairs with the wheels of a cart at the shuttle conveyor outlet end so that the control means can provide for operating the first transfer means to move carts individually from the shuttle conveyor outlet end to the lateral conveyor intake end when the first sensing means determines a cart is present at the shuttle conveyor outlet end, and when a guide pair is properly aligned and no cart is present at the lateral conveyor intake end.

4. The system as defined in claim 3, and further including fourth, fifth and sixth sensing means connected to the control means, the fourth sensing means for sensing whether or not a cart is present at the lateral conveyor outlet end, the fifth sensing means for sensing whether or not a cart is present at a loading means cart receiving platform, and the sixth sensing means for sensing the position of the wheel guide pairs with respect to the lateral conveyor outlet end for providing alignment of the guide pairs with a wheel track pair on the platform and a guide pair at the lateral conveyor outlet end so that the control means can provide for operating the second transfer means to move carts individually from the lateral conveyor outlet end to the loading means platform when a cart is present at the lateral conveyor outlet end, and when a guide pair is properly aligned with the platform track pair and no cart is present on the platform.

5. The system as defined in claim 1, and the first transfer means comprising a third drive cylinder secured to the shuttle conveyor and operating a single dog means for moving carts from the shuttle conveyor to the lateral conveyor.

6. The system as defined in claim 5, and the second transfer means comprising a fourth drive cylinder secured to the shuttle conveyor and operating a second single dog means for moving carts from the lateral conveyor to the loading means cart receiving platform.

7. The system as defined in claim 1, and further including automatic removing means adjacent the loading means and operated by the control means for removing loaded carts from the loading means cart receiving platform.

8. The system as defined in claim 7, and further including an out-take conveyor, the out-take conveyor having drive means operated by the control means, and having a receiving end adjacent the removing means and an outlet end adjacent a freight dispersing area, and the out-take conveyor for receiving carts by action of the removing means so that the carts can be transported there along to the freight dispersing area.

9. A conveying system for conveying wheeled carts from a cart assembly area to a cart loading means and from the loading means to a freight dispersing area, comprising:

a shuttle conveyor having an intake end and an outlet end, the intake end located in the assembly area for receiving a plurality of carts, and the shuttle conveyor comprising a ratchet conveyor and including a drive bar having a plurality of gravity dogs and having a drive cylinder means for moving the drive bar, and having first sensing means connected to a control means for sensing whether or not a cart is present at the shuttle conveyor outlet end for terminating the operation of the cylinder means, a lateral conveyor, the lateral conveyor having an intake end and an outlet end, and the lateral conveyor extending transversely to the shuttle conveyor wherein the lateral conveyor intake end is positioned adjacent the shuttle conveyor outlet end for receiving carts directly from the shuttle conveyor, and the lateral conveyor comprising a chain conveyor and having a drive motor for operating a pair of continuous chains, and the chains having a plurality of cart receiving guide pairs, and the lateral conveyor further including second sensing means connected to the control means, the second sensing means for sensing the position of the wheel guide pairs with respect to the shuttle conveyor outlet end for providing alignment of the guide pairs with the wheels of a cart at the shuttle conveyor outlet end so that the control means can provide for operating a first transfer means to move carts individually from the shuttle conveyor outlet end to the lateral conveyor intake end when the first sensing means determines a cart is present at the shuttle conveyor outlet end, and when a guide pair is properly aligned, second transfer means for transferring the carts from the lateral conveyor outlet end to the loading means, and the control means for regulating the operation of the shuttle and lateral conveyors and the first and second transfer means so that the operation thereof is coordinated for moving the carts individually from the assembly area to the loading means.

10. The system as defined in claim 9, and including third sensing means connected to the control means for sensing whether or not a cart is present at the lateral conveyor intake end so that the first transfer means is not operated if a cart is positioned at the lateral conveyor intake end.

11. The system as defined in claim 9, and the drive cylinder means comprising a first and a second drive cylinder, the control means for operating the first drive cylinder individually or operating both the first and second drive cylinders substantially simultaneously for regulating the amount of extension of the drive bar so that when a cart is sensed at the shuttle conveyor outlet end the first drive cylinder is operated individually so that the distance the drive bar is extended is less than the distance the bar is extended when the first and second drive cylinders are operated substantially simultaneously, wherein this reduced distance prevents driving contact between a gravity dog and the cart at the shuttle conveyor outlet end, and prevents any driving contact between a gravity dog and any further carts accumulated against the cart at the shuttle conveyor outlet end, but where the single operation of the first drive cylinder can permit additional movement of any further carts on the shuttle conveyor that are not accumulated against the cart at the shuttle conveyor outlet end.

12. The system as defined in claim 9, and the first transfer means comprising a third drive cylinder secured to the shuttle conveyor and operating a single dog means for moving carts from the shuttle conveyor to the lateral conveyor.

13. The system as defined in claim 9, and further including fourth, fifth and sixth sensing means connected to the control means, the fourth sensing means for sensing whether or not a cart is present at the lateral conveyor outlet end, the fifth sensing means for sensing whether or not a cart is present at a loading means cart receiving platform, and the sixth sensing means for sensing the position of the wheel guide pairs with respect to the lateral conveyor outlet end for providing alignment of the guide pairs with wheel track pair on the platform and a guide pair at the lateral conveyor outlet end so that the control means can provide for operating the second transfer means to move carts individually from the lateral conveyor outlet end to the loading means platform when a cart is present at the lateral conveyor outlet end, and when a guide pair is properly aligned with the platform track pair and no cart is present on the platform.

14. The system as defined in claim 9, and the second transfer means comprising a fourth drive cylinder secured to the lateral conveyor adjacent the outlet end thereof for operating a single dog means for moving carts from the lateral conveyor to the loading means.

15. The system as defined in claim 9, and further including automatic removing means adjacent the loading means, the moving means operated by the control means for removing loaded carts from the loading means.

16. The system as defined in claim 15 and further including an out-take conveyor, the out-take conveyor having drive means, and having a receiving end adjacent the removing means and an outlet end adjacent the freight dispersing area, and the out-take conveyor drive means regulated by the control means, and the out-take conveyor for receiving carts by action of the removing means so that the carts can be transported there along to the freight dispersing area.

17. A conveying system for conveying wheeled carts from a cart assemble area to a cart loading means and from the loading means to a freight dispersing area, comprising:

a shuttle conveyor having an intake end and an outlet end, and the shuttle conveyor intake end positioned in the assembly area for receiving a plurality of carts, and the shuttle conveyor comprising a ratchet conveyor and including a drive bar having a plurality of gravity dogs and having a drive cylinder means for moving the drive bar, and having first sensing means connected to a control means for sensing whether or not a cart is present at the shuttle conveyor outlet end, a lateral conveyor, the lateral conveyor having an intake end and an outlet end and extending transversely to the shuttle conveyor wherein the lateral conveyor intake end is adjacent the shuttle conveyor outlet end, and the lateral conveyor comprising a chain conveyor and having a drive motor for operating a pair of continuous chains, and the chains having a plurality of cart receiving guide pairs, and the lateral conveyor including second sensing means, the second sensing means for sensing the position of the wheel guide pairs with respect to the shuttle conveyor outlet end for providing alignment of the guide pairs with the wheels of a cart at the shuttle conveyor outlet end so that the control means can provide for operating a first transfer means to move carts individually from the shuttle conveyor outlet end to the lateral conveyor intake end when the first sensing means determines a cart is present at the shuttle conveyor outlet end, and when a guide pair is properly aligned, second transfer means for transferring the carts from the lateral conveyor outlet end to the loading means, automatic removing means adjacent the loading means and connected to the control means for removing loaded carts from the loading means, an out-take conveyor, the out-take conveyor having drive means, and having a receiving end adjacent the removing means and an outlet end adjacent the freight dispersing area, and the outlet conveyor drive means regulated by the control means, and the outlet conveyor receiving carts by action of the removing means so that the carts can be transported there along to the freight dispersing area, and the control means for regulating the operation of the shuttle, lateral and out-take conveyors, the first and second sensing means, the first and second transfer means and the removing means so that the operation thereof is coordinated for moving the carts individually from the assembly area to the dispersing area.

18. The system as defined in claim 17, and the first transfer means comprising a second drive cylinder secured to the shuttle conveyor and operating a single dog means for moving carts from the shuttle conveyor to the lateral conveyor.

19. The system as defined in claim 18, and the second transfer means comprising a third drive cylinder secured to the lateral conveyor adjacent the outlet end thereof for operating a second single dog means for moving carts from the lateral conveyor to the loading means.

20. The system as defined in claim 17, and the shuttle conveyor drive cylinder means comprising a first and a second drive cylinder, the control means for operating the first drive cylinder individually or operating both the first and second drive cylinders substantially simultaneously for regulating the amount of extension of the drive bar so that when a cart is sensed at the shuttle conveyor outlet end the first drive cylinder is operated individually so that the distance the drive bar is extended is less than the distance the bar is extended when the first and second drive cylinder are operated substantially simultaneously, wherein this reduced distance prevents driving contact between a gravity dog and the cart at the shuttle conveyor outlet end, and prevents any driving contact between a gravity dog and any further carts accumulated against the cart at the shuttle conveyor outlet end, but where the single operation of the first drive cylinder can permit additional movement of any further carts on the shuttle conveyor that are not accumulated against the cart at the shuttle conveyor outlet end.

21. The system as defined in claim 17, and including third sensing means connected to the control means for sensing whether or not a cart is present at the lateral conveyor intake end so that the first transfer means is not operated if a cart is positioned at the lateral conveyor intake end.

22. The system as defined in claim 21, and further including fourth, fifth and sixth sensing means connected to the control means, the fourth sensing means for sensing whether or not a cart is present at the lateral conveyor outlet end, the fifth sensing means for sensing whether or not a cart is present at a loading means cart receiving platform, and the sixth sensing means for sensing the position of the wheel guide pairs with respect to the lateral conveyor outlet end for providing alignment of the guide pairs with a wheel track pair on the platform and a guide pair at the lateral conveyor outlet end so that the control means can provide for operating the second transfer means to move carts individually from the lateral conveyor outlet end to the loading means platform when a cart is present at the lateral conveyor outlet end, and when a guide pair is properly aligned with the platform track pair and no cart is present on the platform.

23. The system as defined in claim 17, and the removing means including a fourth cylinder operating a single dog means for pushing a loaded cart from the loading means to the out-take conveyor, and the out-take conveyor comprising a second ratchet conveyor.

* * * * *